(12) United States Patent
Masanek, Jr. et al.

(10) Patent No.: US 11,305,680 B1
(45) Date of Patent: Apr. 19, 2022

(54) MULTI-PART VEHICLE FLOOR COVER WITH LAP JOINT

(71) Applicant: MACNEIL IP LLC, Bolingbrook, IL (US)

(72) Inventors: Frederick W. Masanek, Jr., Barrington, IL (US); Radoslaw Nowak, Wood Dale, IL (US); David F. MacNeil, Fort Lauderdale, FL (US)

(73) Assignee: MACNEIL IP LLC, Bolingbrook, IL (US)

( * ) Notice: Subject to any disclaimer, the term of this patent is extended or adjusted under 35 U.S.C. 154(b) by 0 days.

(21) Appl. No.: 17/132,809

(22) Filed: Dec. 23, 2020

(51) Int. Cl.
*B60N 3/04* (2006.01)
(52) U.S. Cl.
CPC .............. *B60N 3/048* (2013.01); *B60N 3/046* (2013.01)
(58) Field of Classification Search
None
See application file for complete search history.

(56) References Cited

U.S. PATENT DOCUMENTS 10,059,242 B1 * 8/2018 Willobee ............... B60N 3/046

* cited by examiner

*Primary Examiner* — Alexander S Thomas
(74) *Attorney, Agent, or Firm* — Perkins IP Law Group LLC; Jefferson Perkins

(57) ABSTRACT

A multi-part vehicle floor cover has a first part with a lateral edge and a second part with a lateral end that mates with the lateral edge of the first part and has a lap panel that extends from the lateral end to a lateral edge of the second part. A plurality of fastening systems join the first part to the lap panel of the second part. Each fastening system has a button, a first hole made in the first part and a second hole made in the second part. The top surface of the button is sloped, and the lower diameters of the holes are greater than the upper diameters thereof. The lap joint makes the manufacture of large floor covers by injection molding practical, while offering an effective method of assembly by the end user.

18 Claims, 5 Drawing Sheets

MULTI-PART VEHICLE FLOOR COVER WITH LAP JOINT

BACKGROUND OF THE INVENTION

It is known to provide vehicle floor covers, such as vehicle floor mats and vehicle floor trays, to protect the surfaces of the vehicle foot well(s) in which they are placed from melt water, mud, dirt, sand and the like. Usually such floor covers offer a fluid-impervious barrier so that melt water and the like won't penetrate the floor cover and stain the carpeting underneath the floor cover. Custom-fit floor covers are designed for particular makes and models of vehicles. Ideally the floor covers should protect as much of the surface area of the foot wells of the vehicle as possible.

Floor covers have been devised to cover multiple vehicle foot wells and/or multiple rows of same. Where these are molded using a thermoplastic polymer compound such as a TPE, the molds used to make these floor covers can be quite large and unwieldy. Prior attempts have been made to provide such floor covers in multiple parts, with the consumer then assembling such parts together when the consumer installs the floor cover into the vehicle. These prior attempts have produced results that are less than acceptable. There continues to be a need, therefore, for a multi-part vehicle floor cover which is easy for the consumer to assemble, and which will, when assembled, present a virtually fluid-impervious barrier over a wide expanse of the floor of the vehicle.

SUMMARY OF THE INVENTION

To address this problem, the inventors have conceived of a multi-part vehicle floor cover with a lap joint. The floor cover has a first part with a first top surface, a first bottom surface, and a first thickness between them. The first part terminates in a first edge. A second part of the floor cover has a second top surface, a second bottom surface and a second thickness between these last surfaces. The second part terminates in a second edge. A plurality of fastening systems are used to fasten the first part to the second part. These fastening systems are laterally spaced apart from each other and each includes a first hole made in the first part, a second hole made in the second part, and a button that, in use, is inserted through the second and first holes along a fastening system axis. For each of the first and second holes, a diameter of the hole taken at the bottom surface is greater than a diameter of the hole taken at the top surface. The button has a top cap with a lateral periphery, a bottom ring and a shaft that extends between them. A diameter of the bottom ring is greater than the bottom diameter of the second hole. A diameter of the lateral periphery of the top cap is greater than the top diameters of the second and first holes. A length of the shaft between the top cap and the bottom ring is greater than the sum of the first and second thicknesses, permitting a degree of overdrive when assembling the first part to the second part.

In one embodiment, a curved annular surface joins the inner sidewall of the first hole to the first bottom surface. In one embodiment, a curved annular surface joins the inner sidewall of the second hole to the second bottom surface. In one embodiment, the upper surface of the top cap of the button has a downwardly and outwardly sloped outer region, such that, when the button is being inserted through the second hole, the outer region of the top cap cams against the curved annular surface of the second hole. In like fashion, this outer region of the top cap may cam against the curved annular surface of the first hole.

Preferably the first and second parts are molded from an elastic polymer compound such as a thermoplastic elastomer (TPE). The elasticity of first and second parts as molded should be sufficient to permit the top cap of the button to be pressed through the second hole and then through a first hole aligned with it, thereby affixing the first part of the floor cover to the second part.

In one embodiment, the second part has a body with a lateral end. This lateral end is adapted to mate with the first edge of the first part. A lap panel extends from the lateral end to the second edge of the second part, so that the second edge is spaced from the lateral end. The second holes of each of the fastening systems are formed through this lap panel. In one embodiment, a top surface of the lap panel is downwardly offset from the top surface of the body of the second part, and extends underneath the first part when the first part is assembled to the second part.

The lap joint and fastening systems of the present invention facilitate the molding of the vehicle floor cover in multiple parts, and provide a superior way for the end user to assemble them into a large vehicle floor cover that will be an effective barrier to the elements.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
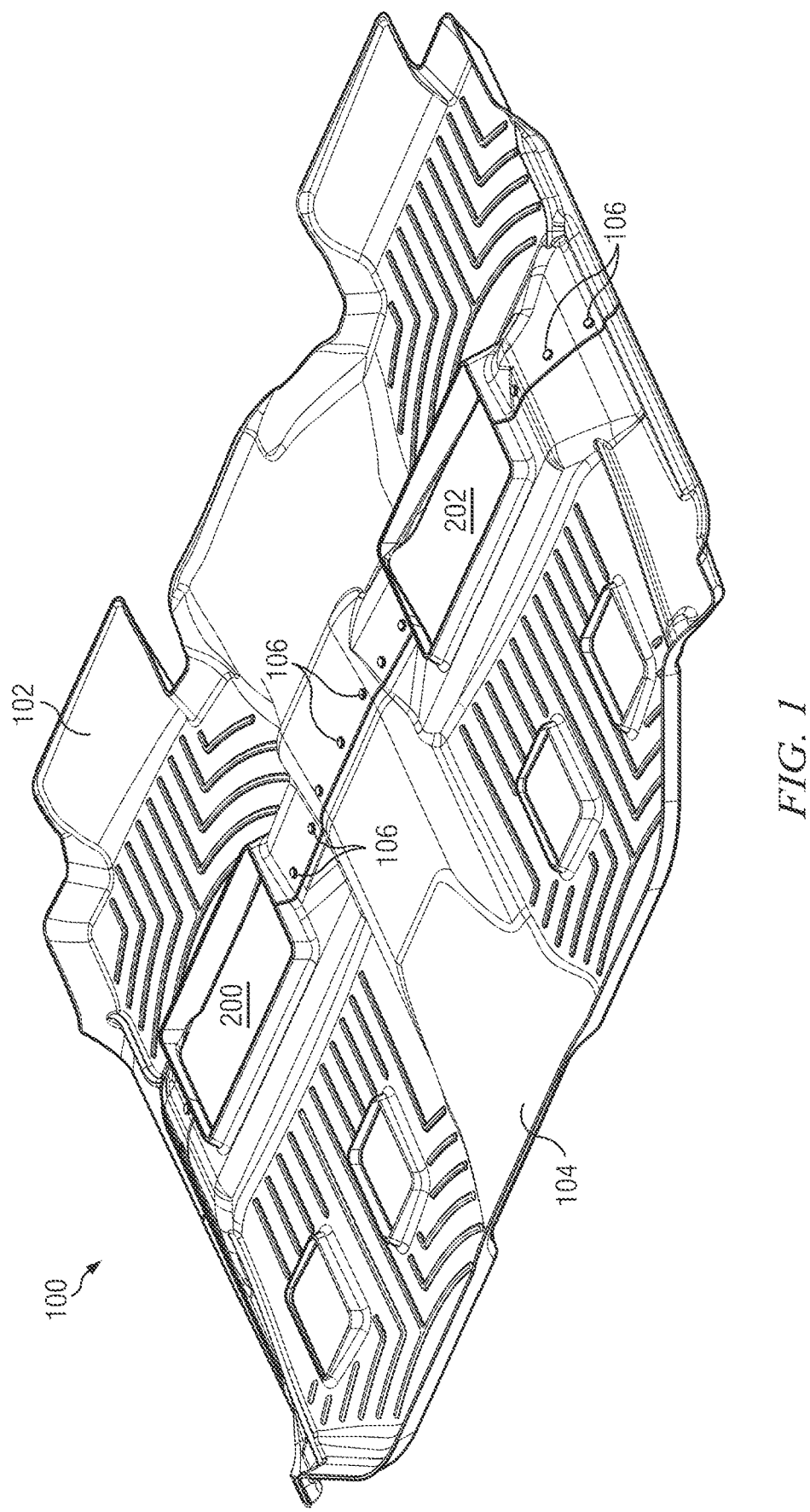
FIG. 1 is a top right rear perspective view of a multi-part custom vehicle floor mat according to the invention, as assembled.
Figure 2:
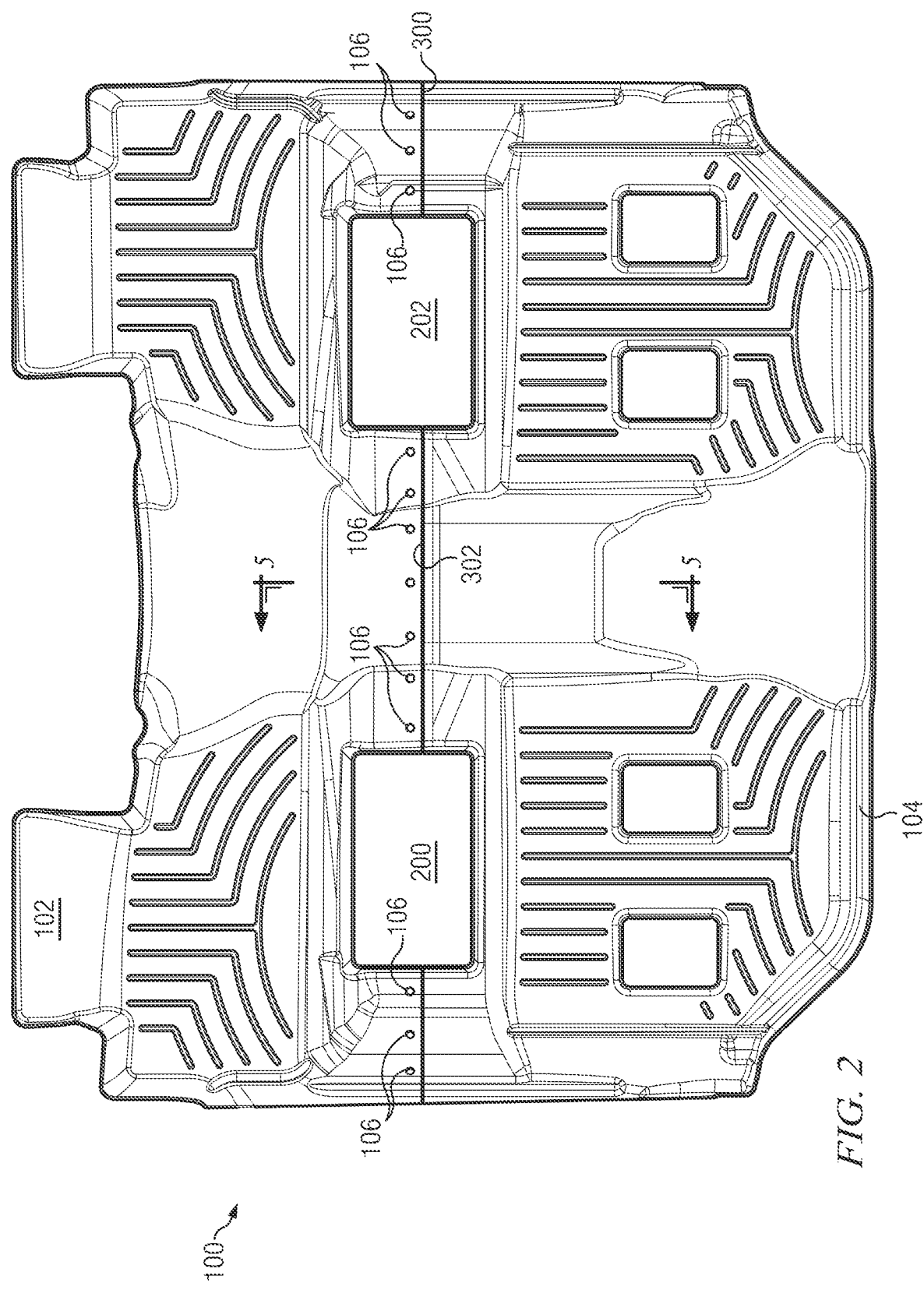
FIG. 2 is a plan view of the embodiment shown in FIG. 1.

A multi-part vehicle floor cover is indicated generally at 100 in FIGS. 1 and 2. This particular floor cover is a floor mat and is custom-molded for the second and third seat rows of a 2021 Chevrolet Suburban. Of course, the invention has application to any situation in which the floor trays or mats to be molded are large, particularly where they cover multiple foot wells and/or multiple rows. The floor mat 100 has a front or first part 102, meant to be installed in a second seat row of the vehicle, and a rear or second part 104 meant to be installed in a third seat row of the vehicle. Parts 102 and 104 may be injection-molded of a polymer having at least some elasticity, such as a thermoplastic elastomer (TPE). Alternatively parts 102 and 104 may be compression-molded of a thermosetting elastomer such as rubber.

A plurality of fastening systems 106 are used to fasten the front or first part 102 to the rear or second part 104. The fastening systems 106 are laterally spaced apart from each other. Where the parts to be joined are for multiple seat rows as shown, the locations of the fastening systems 106 may be positioned to be underneath a row of seats. In the illustrated embodiment, parts 102 and 104 define a left seat pedestal hole 200 and a right seat pedestal hole 202. The designer advantageously may choose to position the rear edge of part 102, and the front end of part 104, underneath the second row of seats, and position the fastening systems 106 in a transverse array at that location, as shown.

Figure 3:
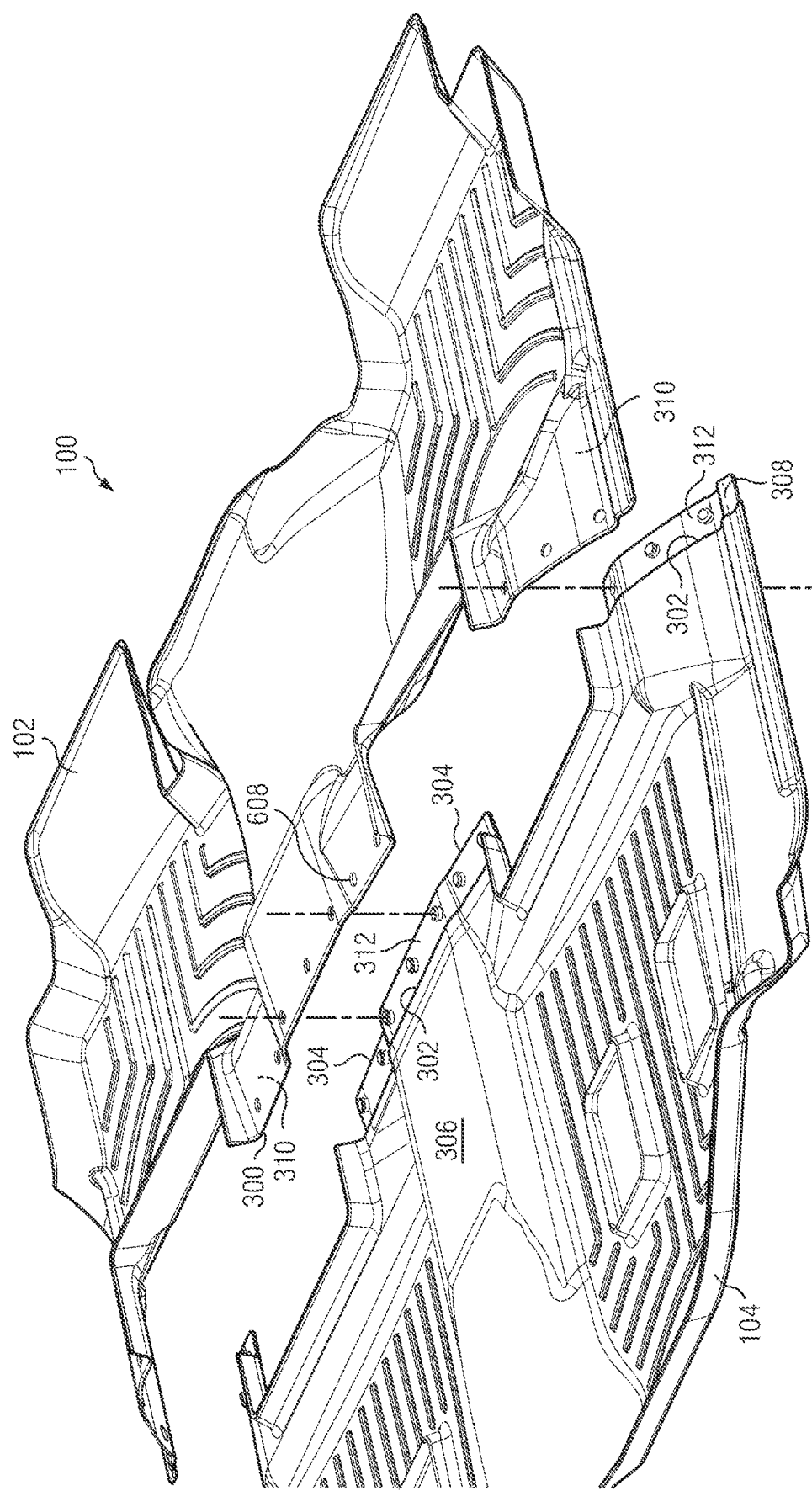
FIG. 3 is an exploded detail of the embodiment shown in FIG. 1, shown at an intermediate stage of assembly.

In FIG. 3, the front part 102 and the rear part 104 are shown in exploded view. The front part 102 has a rear lateral edge 300. This rear edge 300 is adapted to mate with a front lateral end 302 of the rear part 104. The lateral end 302 is rearwardly displaced from a front edge 304 of the rear part 304. The lateral end, wall or step 302 separates a body 306 of part 104 from a lap panel 308, the latter of which extends forwardly from end 302, while body 306 extends rearwardly.

As can be seen, parts 102 and 104 don't have to be flat, and in the illustrated embodiment exhibit considerable three-dimensionality. The contours of bottom surface 310 of part 102 near edge 300 should match the contours of the top surface 312 of lap panel 308, to provide a lap joint that is more resistant to melt water and the like seeping through.

Figure 4:
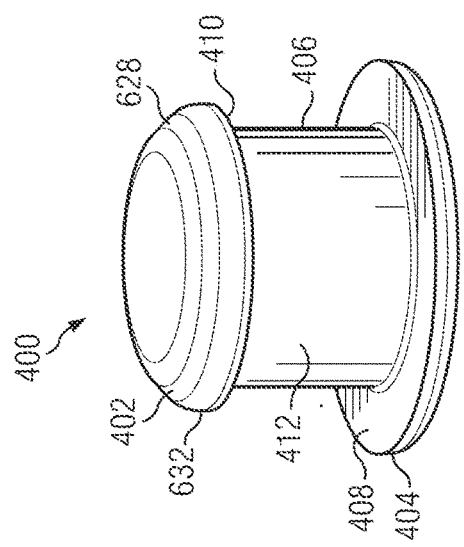
FIG. 4 is a top perspective view of a button according to the invention.

Each fastening system 106 includes a button, one of which is generally shown at 400 in FIG. 4. The button 400 has a top cap 402, a bottom ring 404 and a shaft 406 that extends between a top surface 408 of the ring 404 and a bottom surface 410 of the top cap 402. The shaft 406 has an outer surface 412 that in the illustrated embodiment is cylindrical.

Figure 6:
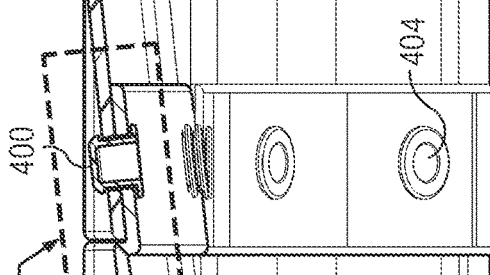
FIG. 6 is a detail of FIG. 5, showing a representative fastening system.
Figure 5:
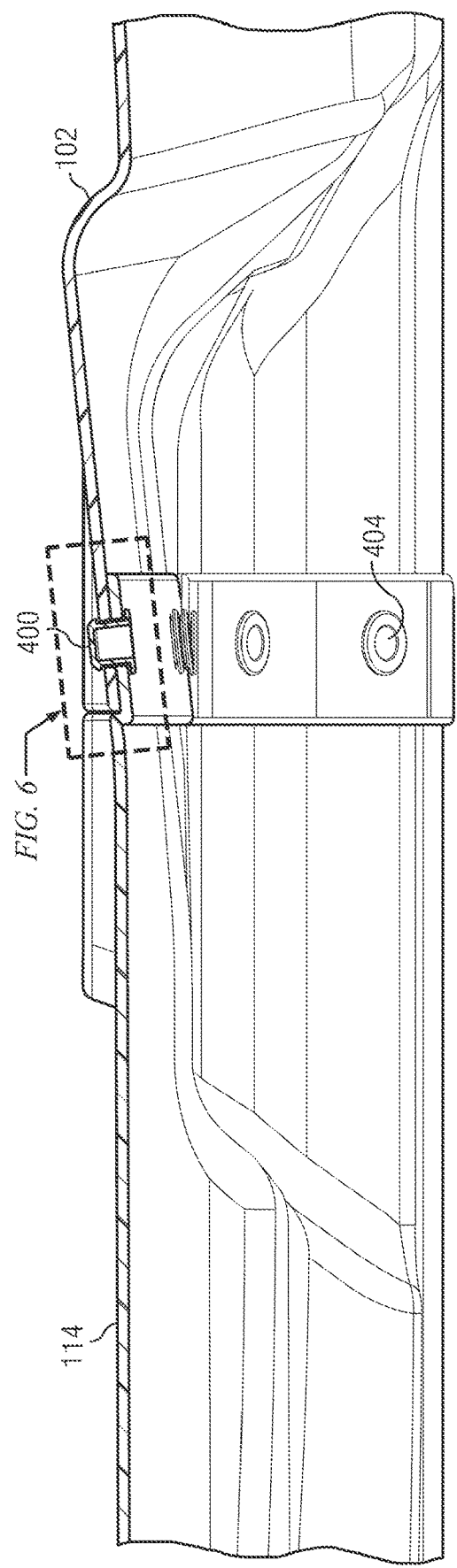
FIG. 5 is a sectional view taken substantially along Line 5-5 of FIG. 2.
Figure 6:
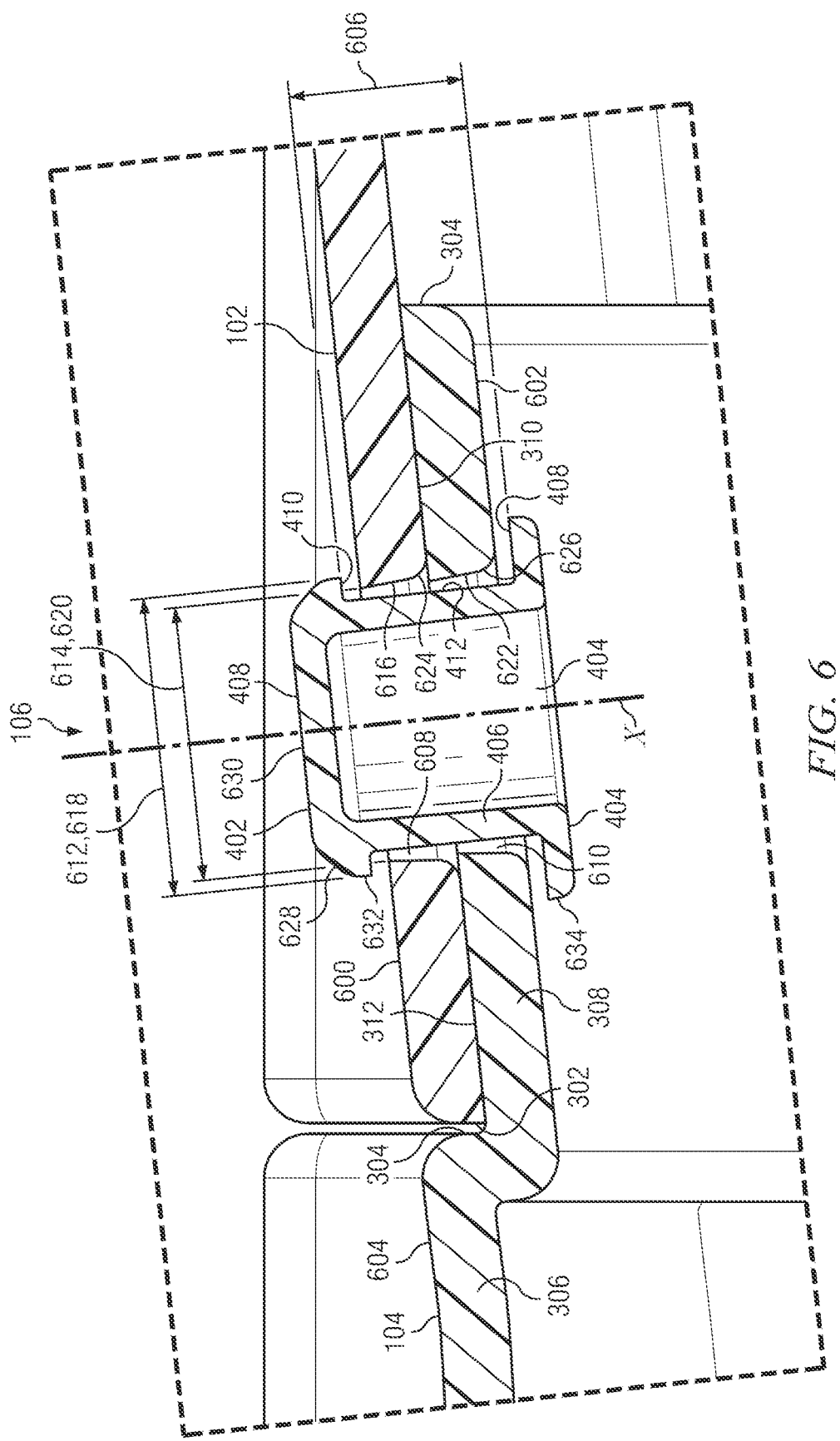

The fastening system 106 is shown in more detail in FIG. 6. The fastening system 106 is formed on a fastening system axis X. The front or first part 102 has a thickness between its top surface 600 and its bottom surface 310 that may be, for example, 0.125". Lap panel 308 has a thickness from its top surface 312 to its bottom surface 602 that may also be 0.125". The top surface 312 of the lap panel 308 may be downwardly displaced or offset from a top surface 604 of rear part body 306, by an amount equivalent to the thickness of the front part 102. This is done so that surfaces 600 and 604 will be substantially continuous when the assembly is completed. In other embodiments, the lap panel 308 may be on the front part 102 instead of the rear part 104, or the lap panel may be arranged to extend over the other part instead of under it as shown.

A length 606 of the shaft 406, as measured between bottom surface 410 and top surface 408, should be greater than the sum of the thicknesses of parts 102 and 104, or more precisely of part 102 and lap panel 308. This is to permit the button 400 to have some overdrive when it is inserted through the lap panel 308 and the front part 102.

The fastening system 106 includes a first hole 608 made through the first part 102, and a second hole 610 made through the lap panel 308. A bottom diameter 612 of the first hole 608, taken at the plane of bottom surface 310, is greater than a top diameter 614 of the first hole 608, taken at the plane of first part top surface 600. For example, top diameter 614 may be 0.500", while bottom diameter 612 may be 0.545". A sidewall 616 of the first hole 608 may be downwardly and outwardly tapered, by an amount such as five degrees.

A bottom diameter 618 of the second hole 610, taken in the plane of bottom surface 602, should be larger than a top diameter 620 of the second hole 610, taken in the plane of top surface 312. Bottom diameter 618 may be, for example, 0.545", while top diameter 618 may be 0.500". An inner sidewall 622 of the hole 610 may be downwardly and outwardly tapered by an amount such as five degrees.

An annular curved surface 624 may join first hole sidewall 616 to first part bottom surface 310. Likewise, an annular curved surface 626 may join second hole sidewall 622 to lap panel bottom surface 602. An outer region 628 of the top surface 630 of the top cap 402 outwardly and downwardly slopes to an outer periphery 632 of the top cap 402 and may be concavely curved as shown. The bottom surface 410 of the top cap 402 inwardly extends from outer periphery 632 to the shaft outer surface 412, with which is makes an abrupt angle. The angle between outer region 628 and bottom surface 410 preferably is acute. This makes the first part 102 much harder to disassemble from second part 104 than it is to assemble these parts together.

An outer diameter 634 of the bottom ring 404 should be substantially larger than second hole bottom diameter 618. For example, ring diameter 634 may be 0.700". This is to prevent button 400 from pulling through second hole 610 and first hole 608.

In the illustrated embodiment, the button 400, first hole 608 and second hole 610 are all radially symmetrical, that is, they are all defined by surfaces of rotation around axis X. But it could be otherwise. The button 400 and the holes 608, 610 could be formed as squares, polygons, ovals or other shapes; in some of these alternative embodiments, the cross-sectional shape of the button 400 would correspond to the cross-sectional shapes of the holes 608 and 610. But in other embodiments, the holes 608, 610 could be slits or another shape in which the diameter of the shape in one direction is much greater than the diameter in an orthogonal direction. The elasticity of the TPE would permit the preferably sloped or curved top cap 402 to push through such restricted openings and accomplish the same fastening function.

In operation, and preferably at the factory, button 400 is inserted through second hole 610. As the button 400 is inserted through hole 610, the sloped or convexly curved surface 628 cams against second hole curved annular surface 626. Outer periphery 632 then slides along inner sidewall 622, stretching hole 610 until top cap periphery 632 is beyond lap panel top surface 312. Button 400 will then snap into place into the second hole 610. This is performed for every fastening system 106, to obtain a condition shown in FIG. 3: the rear or second part 104 now carries a button 400 in each respective second hole 610. Preferably the rear part 104 and the front part 102 are shipped to the consumer in the condition shown in FIG. 3.

The consumer or end user then completes the assembly. In the illustrated embodiment, the end user fits the rear part 104 to the third row of the vehicle, such that the front edge 304 thereof is positioned underneath the second row seating. Then, the consumer fits the front part 102 to the second row of the vehicle, such that the rear edge 300 thereof mates with the lateral end or wall 302 of the rear part 104. The consumer then presses the front part 102 down on the lap panel 308 at a selected location of a fastening system 106. While this is happening, the surface 628 of the top cap 402 will cam against annular curved surface 624 and will slide up tapered first hole sidewall 616, until the outer periphery 632 clears the first hole top surface 600. The consumer will be rewarded with a snap or click to tell him or that the fastening of this particular fastening system 106 is now complete. This is repeated for each fastening system 106 along the length of the lap panel 308. The consumer will then have securely joined part 102 to part 104 along a lap joint defined by lap panel 308 and the overlying portion of part 102.

In summary, a multi-part vehicle floor cover has been disclosed and illustrated that employs a lap joint between elastomeric first and second parts. Buttons are forced through respective holes in a lap panel and in a part portion laterally occupying the same space as the lap panel. Lower diameters of the holes are wider than the upper diameters thereof, and a top surface of the button top cap is downwardly sloped so as to easily snap each button through the holes.

While illustrated embodiments of the present invention have been described and illustrated in the appended drawings, the present invention is not limited thereto but only by the scope and spirit of the appended claims.

We claim:

1. A multi-part vehicle floor cover comprising:
   a first part having a first top surface, a first bottom surface, and a first thickness between the first top surface and the first bottom surface, the first part terminating in a first edge;
   a second part having a second top surface, a second bottom surface, a second thickness between the second top surface and the second bottom surface, the second part terminating in a second edge; and
   a plurality of fastening systems for fastening the first part to the second part, the fastening systems laterally spaced apart from each other, each fastening system including
   a first hole formed in the first part to extend from the first top surface to the first bottom surface, a bottom diameter of the first hole taken at the first bottom surface being greater than a top diameter of the first hole taken at the first top surface, the first hole formed on a fastening system axis;
   a second hole formed in the second part to extend from the second top surface to the second bottom surface, a bottom diameter of the second hole taken at the second bottom surface being greater than a top diameter of the second hole taken at the second top surface, the second hole disposed on the fastening system axis when the first part is joined to the second part; and
   a button having a top cap with a lateral periphery, a bottom ring, and a shaft extending between the top cap and the bottom ring, the button disposed on the fastening system axis when the first part is joined to the second part, a diameter of the bottom ring being greater than the bottom diameter of the second hole, a diameter of the lateral periphery of the top cap being greater than the top diameter of the second hole and the first hole, a length of the shaft between the top cap and the bottom ring being greater than the sum of the first thickness and the second thickness.

2. The multi-part vehicle floor cover of claim 1, wherein an inner sidewall of the first hole is tapered from the bottom diameter of the first hole to the top diameter of the first hole.

3. The multi-part vehicle floor cover of claim 1, wherein an inner sidewall of the second hole is tapered from the bottom diameter of the second hole to the top diameter of the second hole.

4. The multi-part vehicle floor cover of claim 1, wherein the first hole has an inner sidewall, a curved annular surface joining the inner sidewall to the first bottom surface.

5. The multi-part vehicle floor cover of claim 4, wherein an upper surface of the top cap of each button has a downwardly and outwardly sloped outer region, the outer region camming against the curved annular surface of the first hole as the top cap of the button is being inserted through the first hole.

6. The multi-part vehicle floor cover of claim 1, wherein the second hole has an inner sidewall, a curved annular surface joining the inner sidewall to the second bottom surface.

7. The multi-part vehicle floor cover of claim 6, wherein an upper surface of the top cap of each button has a downwardly and outwardly sloped outer region, the outer region camming against the curved annular surface of the second hole as the top cap of the button is being inserted through the second hole.

8. The multi-part vehicle floor cover of claim 1, wherein the top cap of each button has a downwardly and outwardly sloped outer region terminating at the lateral periphery of the top cap, the shaft of the button having an outer surface, a bottom surface of the top cap extending from the lateral periphery of the top cap to the outer surface of the shaft and disposed at an abrupt angle to the outer surface of the shaft.

9. The multi-part vehicle floor cover of claim 1, wherein the first part has a first lateral edge, the first holes of the fastening systems disposed laterally inwardly from the first lateral edge; and
   the second part has a body with a lateral end adapted to mate with the first lateral edge, a lap panel extending from the lateral end in a direction opposite from the body, the lap panel having a second lateral edge spaced from the lateral end, the second holes of the fastening systems disposed between the lateral end and the second lateral edge.

10. The multi-part vehicle floor cover of claim 9, wherein the body of the second part has a top surface and the lap panel has a top surface downwardly offset from the top surface of the body, the lap panel extending underneath the first part.

11. In a multi-part vehicle floor cover, a lap joint comprising:
    a first part with a first lateral edge, a first top surface, a first bottom surface, and a first thickness between the first top surface and the first bottom surface;
    a second part having a body, a lateral end of the body adapted to mate with the first lateral edge, a lap panel of the second part extending from the lateral end in a direction opposite the body and having a second lateral edge spaced from the lateral end, the lap panel having a second top surface, a second bottom surface and a second thickness between the second top surface and the second bottom surface; and
    a plurality of fastening systems for fastening the first part to the lap panel of the second part, the fastening systems laterally spaced apart from each other and spaced from the lateral end, the first lateral edge and the second lateral edge, each fastening system including
    a first hole formed in the first part to extend from the first top surface to the first bottom surface, a bottom diameter of the first hole taken at the first bottom surface being greater than a top diameter of the first hole taken at the first top surface, the first hole formed on a fastening system axis;
    a second hole formed in the lap panel to extend from the second top surface to the second bottom surface, a bottom diameter of the second hole taken at the second bottom surface being greater than a top diameter of the second hole taken at the second top surface, the second hole disposed on the fastening system axis when the first part is joined to the lap panel; and
    a button having a top cap with a lateral periphery, a bottom ring, and a shaft extending between the top cap and the bottom ring, the button disposed on the fastening system axis when the first part is joined to the lap panel, a diameter of the bottom ring being greater than the bottom diameter of the second hole, a diameter of the lateral periphery of the top cap being greater than the top and bottom diameters of the second hole and the first hole, a length of the shaft between the top cap and the bottom ring being greater than the sum of the first thickness and the second thickness.

12. The lap joint of claim 11, wherein an inner sidewall of the first hole is tapered from the bottom diameter of the first hole to the top diameter of the first hole.

13. The lap joint of claim 11, wherein an inner sidewall of the second hole is tapered from the bottom diameter of the second hole to the top diameter of the second hole.

14. The lap joint of claim 11, wherein the first hole has an inner sidewall, a curved annular surface joining the inner sidewall to the first bottom surface.

15. The lap joint of claim 14, wherein an upper surface of the top cap of each button has a downwardly and outwardly sloped outer region, the outer region camming against the curved annular surface of the first hole as the top cap of the button is being inserted through the first hole.

16. The lap joint of claim 11, wherein the second hole has an inner sidewall, a curved annular surface joining the inner sidewall to the second bottom surface.

17. The lap joint of claim 16, wherein an upper surface of the top cap of each button has a downwardly and outwardly sloped outer region, the outer region camming against the curved annular surface of the second hole as the top cap of the button is being inserted through the second hole.

18. The lap joint of claim 11, wherein the top cap of each button has a downwardly and outwardly sloped outer region terminating at the lateral periphery of the top cap, the shaft of the button having an outer surface, a bottom surface of the top cap extending from the lateral periphery of the top cap to the outer surface of the shaft and disposed at an abrupt angle to the outer surface of the shaft.

* * * * *